Figure 1:
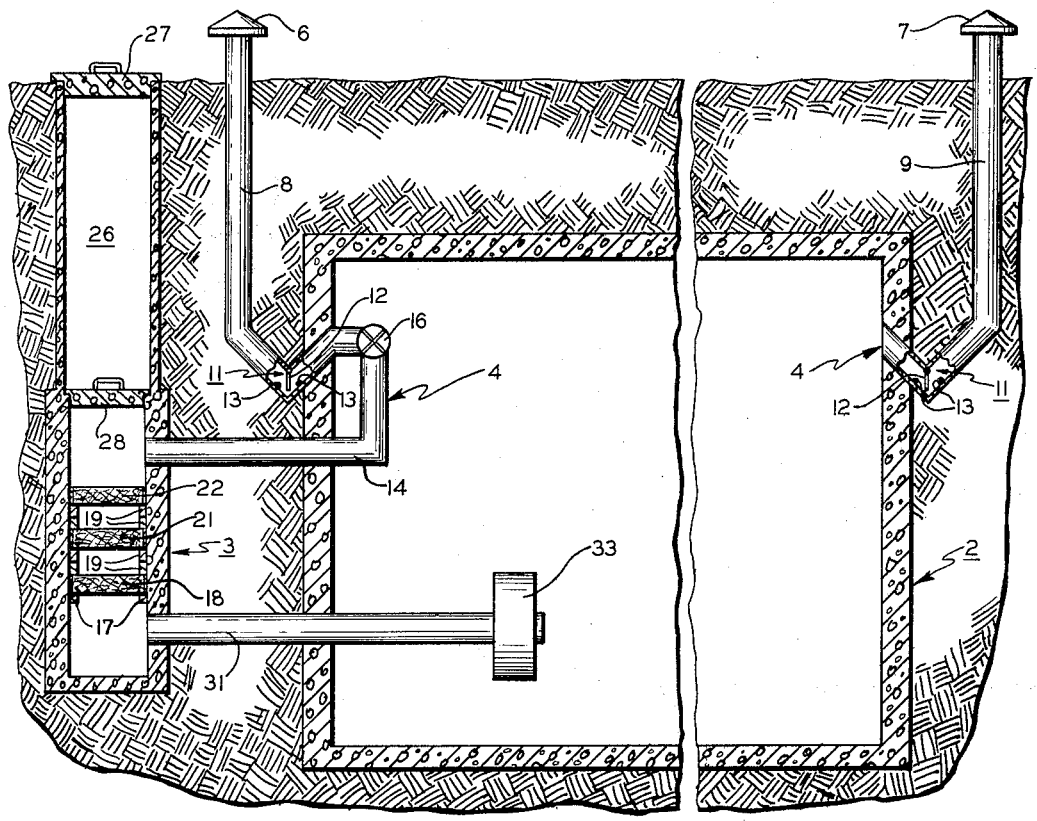

March 29, 1966  T. R. SMITH  3,242,844

FALLOUT SHELTER ARRANGEMENT

Filed Jan. 27, 1964

INVENTOR.
TOM R. SMITH

BY

*Ralph B. Brick*
ATTORNEY 3,242,844
FALLOUT SHELTER ARRANGEMENT
Tom R. Smith, Louisville, Ky., assignor to American Air Filter Company, Inc., Louisville, Ky., a corporation of Delaware
Filed Jan. 27, 1964, Ser. No. 340,382
5 Claims. (Cl. 98—29)

The present invention relates to fallout shelters and more particularly to an improved ventilating system for fallout shelters.

In accordance with the present invention, a novel arrangement is provided for insuring that contaminant particles—particularly contaminant particles of radioactive nature—are separated out from air introduced into the ventilating duct system of fallout shelters in such manner that the particles are removed from the location of personnel enclosures. In addition, the present invention provides a novel and inexpensive arrangement for protecting filtering equipment used to filter out bomb blast contaminants, including a novel protection device to protect filtering equipment from sudden atmospheric pressure variances due to bomb blasts. Further, the present invention provides a novel arrangement for loading and changing filtering equipment in fallout shelters.

Various other features of the present invention will become obvious to one skilled in the art upon reading the disclosure set forth herein.

More particularly, the present invention provides an improved fallout shelter arrangement comprising: a personnel enclosure; a filter chamber positioned in preselected spaced relationship from the personnel enclosure; a ventilating duct system providing communication between atmosphere and the interior of the personnel enclosure, the duct system including a first section extending between atmosphere and the interior of the enclosure, a second section connected to and extending between a portion of the first section in the personnel enclosure and the upstream side of the filter chamber, and a third section connected to and extending between the downstream side of the filter chamber and the interior of the personnel enclosure; and valve means positioned in the personnel enclosure to control "on-off" air flow between the first and second sections of the ventilating duct system. In addition, the present invention provides a mitered duct junction in a ventilating duct system including a flap valve pivotally mounted in such junction, the valve having a cross-sectional area substantially equal to the cross-sectional area of the duct in a plane normal to the longitudinal axis of the duct but less than the cross-sectional area of the duct in a plane across the mitered junction to thereby close off the system in the event of sudden atmospheric pressure variances due to bomb blast. Further, the present invention provides a novel arrangement for supporting a filter bank of spaced unit filters in readily replaceable fashion in the isolated filter chamber aforedescribed.

It is to be understood that various changes can be made by one skilled in the art in the arrangement, form and scope of the apparatus set forth herein without departing from the scope or spirit of the present invention.

Figure 2:
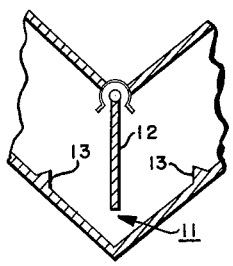

Referring to the drawing which discloses one advantageous embodiment of the present invention:

FIGURE 1 is a partial sectional view of a fallout shelter incorporating the ventilating apparatus of the present invention; and FIGURE 2 is an enlarged view of the valve portion of FIGURE 1.

As can be seen in the drawing, an underground personnel fallout enclosure, designated generally by reference numeral 2, is disclosed as positioned in spaced relationship from an underground filter chamber, designated generally by reference numeral 3. In accordance with the present invention, filter chamber 3 is separated from personnel chamber 2 a sufficient distance to insulate the personnel chamber from any radioactive materials which may be collected in the filter chamber. It is to be understood that the underground arrangement for the personnel enclosure and filter chamber is illustrated solely by way of example and that the present invention contemplates use of above-ground shelter and filter chamber arrangements, as well as underground arrangements.

To provide atmospheric air to personnel enclosure 2 so that the air is first filtered through filter chamber 3, a ventilating duct system, designated generally by reference numeral 4, is provided. Duct system 4 includes hooded atmospheric air inlet 6 and hooded atmospheric outlet 7. Air inlet 6 and air outlet 7 are connected to personnel enclosure 2 by means of duct sections 8 and 9, respectively. Each of these duct sections includes a mitered junction 11 in the form of a V-shaped elbow. Although disclosed advantageously as a 90 degree elbow, it is to be understood that elbows of other angles also can be used. Pivotally mounted within each mitered junction 11 is a flap valve 12. Advantageously, each flap valve 12 is gravity suspended at its junction intersection. Each valve is carefully sized so that it has a cross-sectional area substantially equal to the cross-sectional area of the duct taken in a plane passing normal to the longitudinal axis of such duct. Thus, since it is axiomatic that the hypotenuse of a right triangle is greater than either of its other two sides, it follows that the cross-secional area of each valve 12 is less than the cross-sectional area of the duct taken in a plane passing across the mitered junction. Accordingly, when a bomb blast occurs, creating a sudden variation in atmospheric pressure of sufficient dimension to overcome the preselected inertia of the valve itself, either positively or negatively, valve 12 is moved from gravity suspended neutral or air "on" position to closed or air "off" position in one of two directions, depending upon whether the atmospheric variations created by the blast are positive or negative. It is to be understood that valves 12 are carefully preselected in weight so that they respond only to extraordinary atmospheric variations for movement to closed or "off" position. It is to be noted that ducts 8 and 9 are each provided with valve seats 13 on either side of mitered junctions 11 to allow valves 12 to swing to closed or "off" position without wedging fast.

As can be noted in the drawing, duct 8, which is connected to air inlet 6, extends into personnel enclosure 2, where it connects through valve 16 to duct 14. Duct 14 then extends away from personnel enclosure 2 to the upstream side of filter chamber 3. Valve 16, positioned between ducts 8 and 14, can be a manual "on-off" control valve, allowing personnel in enclosure 2 to shut off air flow into the enclosure when desirable. Accordingly, during early warning periods and for a preselected time after blast when fallout is intense, the inlet side of the duct system can be isolated from atmosphere. It, of course, is to be understood that a similar manual "on-off" control valve (not shown) also can be provided to cooperate with duct section 9 which leads to atmospheric outlet 7.

Filter chamber 3, which as aforementioned is positioned in suitably spaced, insulated relationship from personnel chamber 2 and which is connected to personnel chamber 2 by means of duct 14, includes spaced side rail supports 17 mounted to the opposite internal walls of chamber 3 toward the downstream end thereof. These rails 17 serve to directly support unit filter 18 in a horizontal position. As disclosed, filter 18 is one of several filters which can be inserted in the filter chamber and, as such, serves to support suitable flow-through spacer frames 19 which are inserted on the upstream peripheral face of filter 18 before a second unit filter 21 is placed thereon. In like manner, additional flow-through spacer frames 19 are mounted on filter 21 and a third unit filter 22 inserted thereon. Advantageously, downstream unit filter 18 can be selected from a high efficiency glass fiber material of the absolute type. Intermediate filter 22 can also be of fiber glass but of lesser density material. For example, a 50 FG fiber glass material has proven to be satisfactory. Upstream unit 22 can be of a conventional furnace-type media, such as that sold by assignee under its trademark "AMER-GLAS." It is to be understood that the present invention is not to be considered as limited to any of the filters aforedescribed or to the specific arrangement disclosed but, that other types of filters and other types of filter arrangements can also be used within chamber 3.

In order to load filter chamber 3 with appropriate filters and spacers, chamber 3 is connected to ground level by a loading conduit 26, suitable covers 27 and 28 being provided to seal off the chamber after the filter units have been loaded therein. Connected to the downstream side of filter chamber 3 below the filter units is duct 31, this duct serving to connect the filter chamber with personnel enclosure 2. Duct 31 has connected thereto at its end extending into enclosure 2, blower 33, which blower can be a manual or battery operated type.

With the arrangement aforedescribed, it will be obvious that atmospheric air can pass through air inlet 6, along duct section 8 through valve 16 when in "open" position to isolated filter chamber 3, through the filters stacked therein, through blower 33 and finally into personnel chamber 2. In the event of sudden blast, swing valves 12 are moved to closed or "off" position, serving to protect the filters from either being blown in or out. Further, in the event "fallout" becomes too intense and it is desirable to prevent the filters from loading further under such conditions, manual valve 16 can be moved to closed or "off" position.

The invention claimed is:

1. An improved fallout shelter arrangement comprising:
   (a) a personnel enclosure;
   (b) a filter chamber positioned in preselected spaced and insulated relationship from said personnel enclosure;
   (c) a ventilating duct system providing communication between atmosphere and the interior of said personnel enclosure, said duct system including a first section extending between atmosphere and the interior of said enclosure, a second section connected to and extending between said portion of said first section in said personnel enclosure and the upstream side of said filter chamber, and a third section connected to and extending between the downstream side of said filter chamber and the interior of said personnel enclosure; and,
   (d) valve means positioned in said personnel enclosure to control "on-off" air flow between said first and second sections of said ventilating duct system to selectively control the flow of air from atmosphere through said filter chamber and into said personnel enclosure.

2. The apparatus of claim 1 wherein:
   (a) said ventilating duct system includes a mitered duct junction in said first section in the form of a V-shaped elbow; and,
   (b) a flap valve pivotally mounted to extend by gravity in a neutral vertical position in said mitered duct junction, said valve having a cross-sectional area substantially equal to the cross-sectional area of said duct in a plane normal to the longitudinal axis of said duct but less than the cross-sectional area of said duct in a plane across said mitered junction whereby said first section is closed by said valve in the event of sudden atmospheric pressure variance due to bomb blast.

3. An improved fallout shelter arrangement comprising:
   (a) a personnel enclosure; and
   (b) a ventilating duct system providing communication between atmosphere and the interior of said enclosure;
   (c) said duct system including a mitered duct junction in the form of a V-shaped elbow having a flap valve pivotally mounted to extend by gravity in a neutral vertical position therein;
   (d) said valve having a cross-sectional area substantially equal to the cross-sectional area of said duct in a plane normal to the longitudinal axis of said duct but less than the cross-sectional area of said duct in a plane across said mitered junction whereby said duct system is closed by said valve in the event of sudden atmospheric pressure variance due to bomb blast.

4. An improved fallout shelter arrangement comprising:
   (a) an underground personnel enclosure;
   (b) an underground filter chamber positioned in preselected spaced relationship from said personnel enclosure; said filter chamber including a ground level access port communicable with the upstream side of said chamber;
   (c) a ventilating duct system including inlet and outlet means each providing communication by means of a first duct section between atmosphere and the interior of said enclosure;
   (d) said inlet means further including a second section connected to and extending between said portion of said first section in said underground personnel enclosure and the upstream side of said filter chamber, and a third section connected to and extending between the downstream side of said filter chamber and the interior of said underground personnel enclosure;
   (e) a blower means connected to said third section within the interior of said personnel enclosure;
   (f) manually controllable valve means positioned in said personnel enclosure to control "on-off" air flow between said first and second sections of said inlet means of said duct system to selectively control the flow of air from atmosphere through said filter chamber and into said personnel enclosure;
   (g) a mitered duct junction in the form of a V-shaped elbow in the first sections of said inlet and outlet means of said duct system; and,
   (h) flap valves pivotally mounted to extend by gravity in a neutral vertical position in each of said mitered duct junctions, said valves each having a cross-sectional area substantially equal to the cross-sectional area of its duct in a plane normal to the longitudinal axis of said duct but less than the cross-sectional area of said duct in a plane across said mitered junction whereby said first sections are closed by said valves in the event of sudden atmospheric pressure variance due to bomb blast.

5. The apparatus of claim 4 wherein said filter chamber includes:
(a) spaced, horizontal support rails fastened to the downstream side walls of said chamber;
(b) a high density unit filter removably mounted in horizontal position on said support rails;
(c) a spacer frame mounted on the upstream side of said filter; and,
(d) a lower density unit filter removably mounted in horizontal position on said spacer frame in spaced relationship and upstream said high density filter.

References Cited by the Examiner

UNITED STATES PATENTS

| 2,839,157 | 6/1958 | Schuster | 98—1 |
| 3,111,078 | 11/1963 | Breckenridge | 98—119 |
| 3,129,648 | 4/1964 | Hoff | 98—1 |
| 3,173,356 | 3/1965 | Schierse | 98—1 |

FOREIGN PATENTS 829,412  6/1938  France.

ALDEN D. STEWART, *Primary Examiner.*

JOHN F. O'CONNOR, *Assistant Examiner.*